United States Patent
Huang et al.

(10) Patent No.: US 10,781,523 B1
(45) Date of Patent: Sep. 22, 2020

(54) ELECTROLYTIC COPPER FOIL AND ELECTRODE AND LITHIUM-ION BATTERY COMPRISING THE SAME

(71) Applicant: CHANG CHUN PETROCHEMICAL CO., LTD., Taipei (TW)

(72) Inventors: Huei-Fang Huang, Taipei (TW); Yao-Sheng Lai, Taipei (TW); Jui-Chang Chou, Taipei (TW)

(73) Assignee: Chang Chun Petrochemicals Co., Ltd., Taipei (TW)

( * ) Notice: Subject to any disclaimer, the term of this patent is extended or adjusted under 35 U.S.C. 154(b) by 0 days.

(21) Appl. No.: 16/837,178

(22) Filed: Apr. 1, 2020

(30) Foreign Application Priority Data

Nov. 27, 2019 (TW) .............................. 108143285 A

(51) Int. Cl.
| | |
|---|---|
| *C25D 1/04* | (2006.01) |
| *H01M 10/0525* | (2010.01) |
| *H01M 4/66* | (2006.01) |
| *H01M 4/04* | (2006.01) |
| *H01M 4/70* | (2006.01) |

(52) U.S. Cl.
CPC ............ *C25D 1/04* (2013.01); *H01M 4/0469* (2013.01); *H01M 4/661* (2013.01); *H01M 4/667* (2013.01); *H01M 4/70* (2013.01); *H01M 10/0525* (2013.01)

(58) Field of Classification Search
None
See application file for complete search history.

(56) References Cited

U.S. PATENT DOCUMENTS

2018/0288884 A1* 10/2018 Ori ........................... B32B 7/12

FOREIGN PATENT DOCUMENTS

| CN | 106350836 A | 1/2017 |
|---|---|---|
| TW | 201428139 A | 7/2014 |
| TW | 201900939 A | 1/2019 |
| WO | WO 2017/217085 A1 | 12/2017 |

* cited by examiner

*Primary Examiner* — Wyatt P McConnell
(74) *Attorney, Agent, or Firm* — Muncy, Geissler, Olds & Lowe, P.C.

(57) ABSTRACT

Provided are an electrolytic copper foil, an electrode comprising the same, and a lithium-ion battery comprising the same. The electrolytic copper foil comprises a drum side and a deposited side opposite each other. The drum side and the deposited side each have a Kurtosis (Sku) in a range of 1.8 to 6.4, a developed interfacial area ratio (Sdr) in a range of 0.06% to 13%, and a texture aspect ratio (Str) in a range of 0.1 to 1. With the surface morphology, the electrolytic copper foil has an improved adhesion strength with the active material, and thus improving the charge-discharge cycle life performance of the lithium-ion secondary battery.

19 Claims, 1 Drawing Sheet

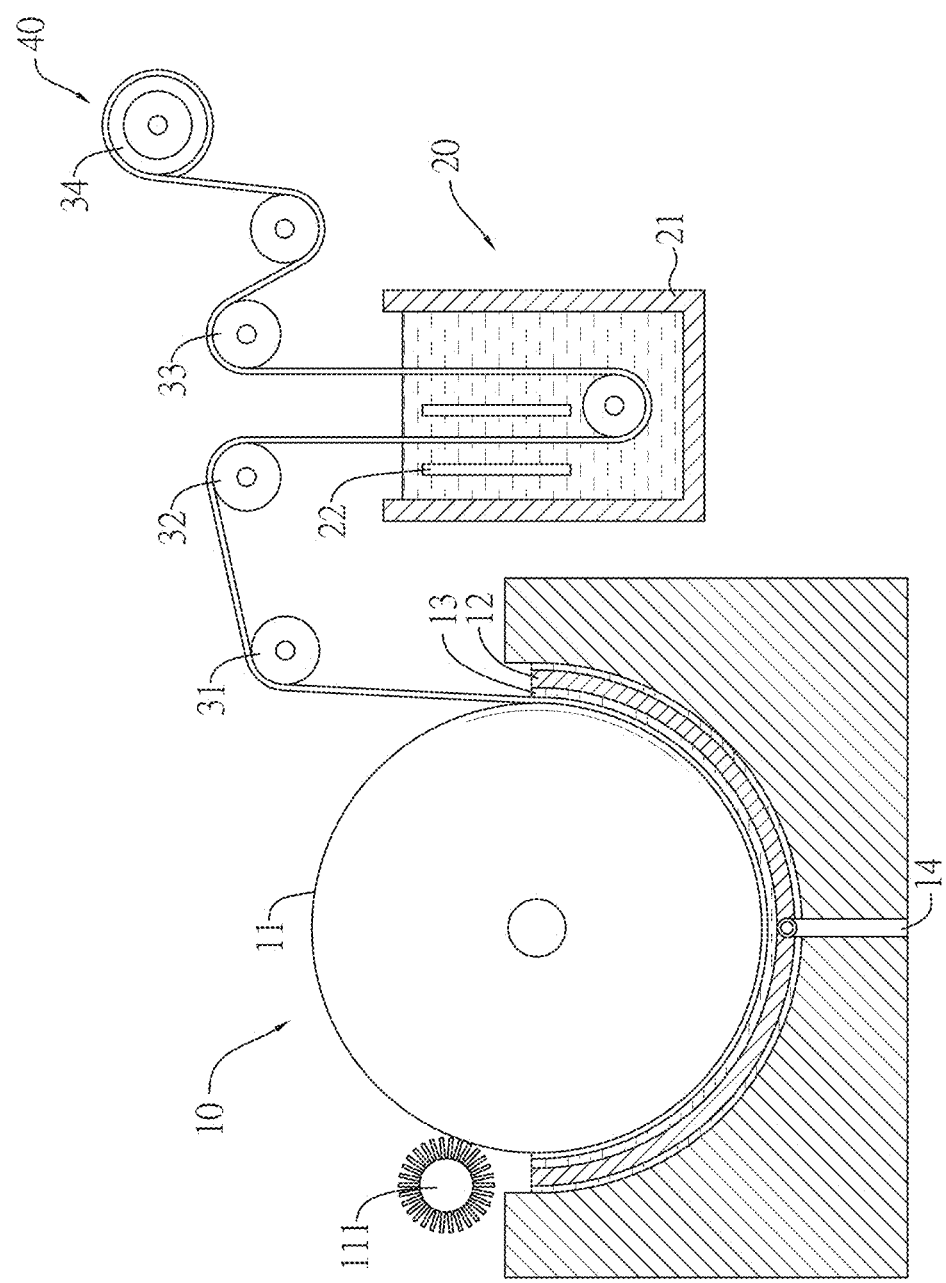

ELECTROLYTIC COPPER FOIL AND ELECTRODE AND LITHIUM-ION BATTERY COMPRISING THE SAME

CROSS-REFERENCE TO RELATED APPLICATION

Pursuant to 35 U.S.C. § 119(a), this application claims the benefit of the priority to Taiwan Patent Application No. 108143285 filed on Nov. 27, 2019. The content of the prior application is incorporated herein by its entirety.

BACKGROUND OF THE INVENTION

1. Field of the Invention

The invention relates to an electrolytic copper foil, especially to an electrolytic copper foil for a lithium-ion battery. In addition, the invention also relates to an electrode and a lithium-ion battery comprising the electrolytic copper foil.

2. Description of the Prior Arts

With the popularization of portable electronic devices (PED), electric vehicles (EV), and hybrid electric vehicles (HEV), the lithium-ion battery with high power density, fast charging, and no memory effects has being actively developed to meet the needs of today's booming market.

The lithium-ion battery relies on lithium ions travelling back and forth between a negative electrode and a positive electrode during charging and discharging. The electrode of the lithium-ion battery is usually produced by coating an active material slurry on a current collector (e.g., a copper foil), so the characteristics and the quality of the copper foil have a great influence on the performance of the lithium-ion battery.

Charge-discharge cycle life performance is an important factor of the lithium-ion battery, which is defined as the number of charge and discharge cycles a lithium-ion battery performs when the capacity drops to 80% of its initial capacity. The lithium-ion battery inevitably expands and contracts during charging and discharging. If the copper foil lacks good adhesion strength with the active materials, the active materials are easily peeled off or detached from the surface of the copper foil during charging and discharging, and thus the charge-discharge cycle life of the lithium-ion battery is shortened.

Therefore, there is still need to improve the charge-discharge cycle life performance of the lithium-ion battery, thereby improving the market value of the lithium-ion battery.

SUMMARY OF THE INVENTION

In view of the above-mentioned drawbacks, one of the objectives of the present invention is to improve the adhesion strength between an electrolytic copper foil and active material, thereby improving the charge-discharge cycle life performance and the market value of the lithium-ion battery.

To achieve the aforesaid objectives, the present invention provides an electrolytic copper foil, which comprises a drum side and a deposited side opposite the drum side thereof. The electrolytic copper foil has the following surface characteristics:

(1) The drum side and the deposited side each have a Kurtosis (referred to as Sku) in a range of 1.8 to 6.4;

(2) The drum side and the deposited side each have a developed interfacial area ratio (referred to as Sdr) in a range of 0.06% to 13%; and (3) The drum side and the deposited side each have a texture aspect ratio (referred to as Str) in a range of 0.1 to 1.

Since the drum side and the deposited side of the electrolytic copper foil each have all the above surface characteristics, the electrolytic copper foil in the present invention applied to a lithium-ion battery has a good adhesion strength with the active material, thereby obviating and mitigating the occurrence that the active material is easily peeled off or detached from the electrolytic copper foil during charging and discharging, and thus improving the charge-discharge cycle life performance of the lithium-ion battery.

According to the present invention, the drum side and the deposited side of the electrolytic copper foil refer to two outermost sides of the electrolytic copper foil opposite each other, which means the drum side and the deposited side are the outermost sides of the electrolytic copper foil. By controlling the surface morphology of the drum side and the deposited side of the electrolytic copper foil, the adhesion strength between the electrolytic copper foil and the active material is effectively enhanced, thereby prolonging the cycle life of the lithium-ion battery comprising the same.

In the present specification, the term "Sku" is directed to a yardstick for determining the sharpness of the height distribution of a surface; the lower Sku represents the height distribution of the surface is flatter, and the higher Sku represents the sharpness of the peaks and valleys of the surface are higher, which means there are more steep peaks and valleys. According to the present invention, the drum side and the deposited side of the electrolytic copper foil both having suitable Sku can obviate and mitigate the occurrence that the active material is easily peeled off or detached from the copper foil, thereby improving the reliability and the durability of the lithium-ion battery.

In the present specification, the term "Sdr" is directed to the ratio of increment of the developed area ($A_1$) of a surface in a specific range over the projected area ($A_0$) of the surface in the specific range, wherein Sdr is calculated by the following formula. The higher Sdr represents higher surface area and more inclined plane of the surface. In contrast, the lower Sdr represents lower surface area and less inclined plane of the surface. When Sdr is 0, the surface is completely level and without any inclined plane.

$$Sdr(\%) = \frac{A_1 - A_0}{A_0} \times 100\%$$

According to the present invention, the drum side and the deposited side of the electrolytic copper foil both have suitable Sdr which can obtain better anchoring effect between the electrolytic copper foil and the active material and also can obviate and mitigate the occurrence that the active material is easily peeled off or detached from the copper foil, thereby improving the reliability and the durability of the lithium-ion battery.

Preferably, the Sdr of the drum side and/or the deposited side of the electrolytic copper foil may be further controlled in a range of 1.5% to 13%, such that the reliability and the durability of the lithium-ion battery may be further optimized and the charge-discharge cycle life performance may be improved when the electrolytic copper foil is applied.

In the present specification, the term "Str" is directed to a measure of uniformity of the surface texture in all directions, that is, the degree of isotropy and anisotropy of the surface. The value of the Str falls to the range of 0 to 1. Str being 0 or close to 0 represents the surface texture is strong anisotropic, and the surface presents a highly regular surface morphology. Str being 1 or close to 1 represents the surface texture is strong isotropic, and the surface presents a highly random surface morphology. Preferably, the drum side and/or the deposited side of the electrolytic copper foil may have a Str in a range of 0.1 to 0.95.

Preferably, the Young's modulus (E) of the electrolytic copper foil may be in a range of 29.4 gigapascals (GPa) to 88.2 GPa. When the Young's modulus of the electrolytic copper foil is lower than 29.4 GPa, the electrolytic copper foil is prone to wrinkles during the manufacturing process, and thus the charge-discharge cycle life of the lithium-ion battery is shortened. When the Young's modulus of the electrolytic copper foil is higher than 88.2 GPa, the structure of the electrolytic copper foil is brittle, such that the electrolytic copper foil is easily cracked or broken during the manufacturing process, which also shortens the charge-discharge cycle life.

In an embodiment, the electrolytic copper foil may be a raw copper foil produced from an electrodeposition step, which is not processed with a surface treatment. In the electrodeposition step, the raw copper foil is prepared by using a copper electrolyte solution comprising copper sulfate and sulfuric acid as main components, a titanium plate coated by iridium or iridium oxide as a dimensionally stable anode (DSA), and a titanium drum as a cathode drum, applying a direct current between these two electrodes to electrodeposit the copper ions in the copper electrolyte solution on the titanium cathode drum, and then stripping and winding the copper layer from the titanium cathode drum continuously.

In another embodiment, the electrolytic copper foil may be a copper foil which is surface-treated after the electrodeposition step. For such embodiment, the electrolytic copper foil comprises a raw copper foil and a surface-treated layer on the raw copper foil, and the drum side and the deposited side are the outermost sides of the electrolytic copper foil. For example, the surface-treated layer of the electrolytic copper foil may be an anti-tarnish treated layer. Specifically, the electrolytic copper foil comprises substantially no roughening-treated layer, which means the raw copper foil is not substantially roughening-treated after the electrodeposition step. The roughing treatment encompasses deposition of roughened particles (e.g., copper-cobalt-nickel alloy particles or copper-nickel-phosphorus alloy particles) or black oxide treatment. In other words, the electrolytic copper foil may be also called "non-roughened electrolytic copper foil".

The present invention further provides an electrode for the lithium-ion battery, which comprises the aforesaid electrolytic copper foil, and the drum side and the deposited side of the electrolytic copper foil also each have the above surface characteristics (Sku, Sdr, and Str).

Furthermore, the present invention further provides a lithium-ion battery comprising the aforesaid electrolytic copper foil, and the drum side and the deposited side of the electrolytic copper foil also each have the above surface characteristics (Sku, Sdr, and Str). The lithium-ion battery comprises a positive electrode, a negative electrode, and an electrolyte solution. In some embodiments, the positive electrode and the negative electrode may be separated through a separator in the lithium-ion battery. Specifically, the lithium-ion battery in the present invention is a lithium-ion secondary battery.

According to the present invention, the electrolytic copper foil may be suitably applied to a negative electrode and/or a positive electrode of the lithium-ion battery. The aforesaid electrolytic copper foil may be suitably applied to a current collector. The electrolytic copper foil may be coated with at least one layer of the active material on one side or both sides thereof to prepare the electrode of the lithium-ion battery.

According to the present invention, the active material may be divided into positive electrode active material and negative electrode active material. The negative electrode active substance contained in the negative electrode active material may be a carbon-containing substance, a silicon-containing substance, a silicon carbide composite, a metal, a metal oxide, a metal alloy or a polymer, wherein the carbon-containing substance or the silicon-containing substance is preferable, but it is not limited thereto. Specifically, the carbon-containing substance may be, but is not limited to, a non-graphitizing carbon, a coke, a graphite, a glasslike carbon, a carbon fiber, an activated carbon, a carbon black or a high polymer calcined substance. The coke may comprise pitch coke, needle coke or petroleum coke, etc. The high polymer calcined substance may be obtained by calcining a phenol-formaldehyde resin or a furan resin at a suitable temperature for carbonation. The silicon-containing substance may have an excellent ability to form an alloy with lithium ions and an excellent ability to extract lithium ions from the lithium alloy. When the silicon-containing substance is applied to a lithium-ion secondary cell, a high energy density secondary cell can be obtained. The silicon-containing substance may be combined with cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), antimony (Sb), chromium (Cr), ruthenium (Ru), molybdenum (Mo), or combinations thereof to form an alloy. The element of the metal or metal alloy may be selected from the group consisting of Co, Fe, Sn, Ni, Cu, Mn, Zn, In, Ag, Ti, Ge, Bi, Sb, Cr, Ru, and Mo, but it is not limited thereto. The aforesaid metal oxide may be, but not limited to, ferric oxide, ferric ferrous oxide, ruthenium dioxide, molybdenum dioxide and molybdenum trioxide. The examples of the aforesaid polymers may include, but are not limited to, polyacetylene and polypyrrole.

According to the present invention, the positive electrode active substance contained in the positive electrode active material may have multiple choices. Depending on the positive electrode active substance, the lithium-ion battery may be classified into $LiCoO_2$ battery, $LiNiO_2$ battery, $LiMn_2O_4$ battery, $LiCo_xNi_{1-x}O_2$ battery, and $LiFePO_4$ battery, etc., but it is not limited thereto.

According to the present invention, the electrolyte solution may comprise a solvent, an electrolyte, or an additive added whenever appropriate. The solvent of the electrolyte solution may comprise a non-aqueous solvent, for example, a cyclic carbonate such as ethylene carbonate (EC) or propylene carbonate (PC); a linear carbonate such as dimethyl carbonate (DMC), diethyl carbonate (DEC), or ethyl methyl carbonate (EMC); or sultone, but it is not limited thereto. Said solvent may be used alone or in combination of two or more solvents.

According to the present invention, the lithium-ion battery may be a stacked lithium-ion battery comprising the negative electrode and the positive electrode stacked through the separator, or may be a spirally-wound lithium-ion battery comprising a continuous electrode and the separator spirally wound and stacked together, but it is not particularly limited thereto. Depending on various applications, the lithium-ion battery may be applied as a cylindrical secondary battery, a square secondary battery, a button type secondary battery, or a coin type secondary battery for a personal notebook computer, a mobile phone, an electric vehicle and an energy storage system, but it is not limited thereto.

BRIEF DESCRIPTION OF THE DRAWINGS

The sole FIGURE is a schematic view of preparing the electrolytic copper foils of Examples 1 to 10.

DETAILED DESCRIPTION OF THE PREFERRED EMBODIMENTS

Hereinafter, several examples are described to illustrate the embodiments of an electrolytic copper foil, an electrode, and a lithium-ion battery of the present invention, and several comparative examples are provided for comparison. One person skilled in the art can easily realize the advantages and effects of the present invention from the following examples and comparative examples. Therefore, it should be understood that the descriptions proposed herein are just preferable examples for the purpose of illustrations only, not intended to limit the scope of the present invention. One person skilled in the art can make various modifications and variations in order to practice or apply the present invention in accordance with the ordinary knowledge without departing from the spirit and scope of the present invention.

Electrolytic Copper Foil

Examples 1 to 10: Electrolytic Copper Foil

Electrolytic copper foils of Examples 1 to 10 were produced by using a production apparatus as shown in the sole FIGURE through the substantially identical process including an electrodeposition step and an anti-tarnish treatment step.

As shown in the sole FIGURE, the production apparatus for producing the electrolytic copper foil comprises an electrodeposition equipment 10, a surface treatment equipment 20, and a series of guide rollers. The electrodeposition equipment 10 comprises a titanium cathode drum 11, an insoluble anode 12, a copper electrolyte solution 13 and a feed pipe 14. The titanium cathode drum 11 is rotatable and comprises a surface which is mechanically polished by a buff 111. The insoluble anode 12 is set below the titanium cathode drum 11 and substantially surrounds the lower half of the titanium cathode drum 11. The titanium cathode drum 11 and the insoluble anode 12 are spaced apart from each other to accommodate the copper electrolyte solution 13 introduced through the feed pipe 14. The surface treatment equipment 20 comprises a treatment tank 21 and an anode plate 22 disposed therein. The series of guide rollers comprise a first guide roller 31, a second guide roller 32, a third guide roller 33, and a fourth guide roller 34 for transporting a raw copper foil, the surface-treated copper foil and the product, and finally the electrolytic copper foil 40 is wound on the fourth guide roller 34.

The method for producing the electrolytic copper foils of Examples 1 to 10 by using the production apparatus of the sole FIGURE is described as follows.

First, the copper electrolyte solution used in the electrodeposition step was prepared. During the electrodeposition step, the titanium cathode drum 11 was rotated on a fixed axis at a constant speed and a current flowed between the titanium cathode drum 11 and the insoluble anode 12, so that copper ions of the copper electrolyte solution 13 were electrodeposited on the surface of the titanium cathode drum 11 to form the raw copper foil. Then the raw copper foil was stripped from the titanium cathode drum 11 and guided to the first guide roller 31.

The composition of the copper electrolyte solution and the parameters of the electrodeposition step were described as follows:

(1) The composition of the copper electrolyte solution:

Copper sulfate ($CuSO_4 \cdot 5H_2O$): about 340 grams per liter (g/L);

Sulfuric acid: about 80 g/L;

Chloride ions (from hydrochloric acid, purchased from RCI Labscan Ltd.): about 35 mg/L;

Glucose (purchased from JUNSEI CHEMICAL): about 2.9 mg/L to 4.6 mg/L; and

Ethylene thiourea (ETU, purchased from Sigma-Aldrich): about 0.9 mg/L to 2.4 mg/L.

(2) The parameters of the electrodeposition step:

Linear velocity of the titanium cathode drum 11: about 2 meters per minute (m/min);

Temperature of the copper electrolyte solution 13: about 46° C.; and

Current density: about 48 Amperes per square decimeter ($A/dm^2$).

During the electrodeposition step, while the titanium cathode drum 11 was rotated on the axis, the buff 111 was rotated on a fixed axis with a linear velocity, and reciprocately moved along the extending direction of the fixed axis of the buff 111 with a cross speed at the same time, so the titanium cathode drum 11 was mechanically polished by the buff 111 to remove the oxides (e.g., titanium oxides or titanium dioxides) on the titanium cathode drum 11, so as to modify the surface characteristics of the raw copper foil.

The parameters of the mechanical-polished step were described as follows:

Type of the buff 111: flap buff, manufactured by Kure Grinding Wheel Co., Ltd., which has multiple abrasive sheets radially arranged around the axis;

Grit # of the buff 111: 600 to 3000;

Linear velocity of the buff 111: about 300 m/min; and

Cross speed of the buff 111: about 15 counts per minute (cpm) to 60 cpm.

Subsequently, the raw copper foil was guided to the surface treatment equipment 20 through the first guide roller 31 and the second guide roller 32 to carry out the anti-tarnish treatment. The raw copper foil was immersed in the treatment tank 21 filled with the anti-tarnish solution, and then processed with electrodeposition to form a chromium layer.

The composition of the anti-tarnish solution and the parameters of the anti-tarnish treatment were described as follows:

(1) The composition of the anti-tarnish solution:

Chromic acid ($CrO_3$): 1.0 g/L.

(2) The parameters of the anti-tarnish treatment:

Temperature of the anti-tarnish solution: 25° C.;

Current density: about 0.5 $A/dm^2$; and

Processing time: about 2 seconds.

After the aforesaid anti-tarnish treatment, the anti-tarnish treated copper foil was guided to the third guide roller 33 to be dried, and wound on the fourth guide roller 34 to obtain the electrolytic copper foil 40 with a thickness of about 6 micrometers (μm).

In the above manufacturing process, the differences among the manufacturing processes of the electrolytic copper foils of Examples 1 to 10 were the cross speed of the buff and the concentration of the glucose and the ETU in the copper electrolyte solution, and the parameters were listed in Table 1 below.

It should be noted that the aforesaid method for producing the electrolytic copper foil is illustrative only for the electrolytic copper foil in the present invention, but the electrolytic copper foil in the present invention is not limited to be produced by the aforesaid method.

It should be noted that, regardless of whether the raw copper foil was performed with surface treatment after the electrodeposition step, two outermost sides of the electrolytic copper foil were defined by the relative positions between the raw copper foil and the titanium cathode drum and between the raw copper foil and the copper electrolyte solution in the electrodeposition step. In an embodiment, for the manufacturing process in which no surface treatment is performed after the electrodeposition step, the electrolytic copper foil is the raw copper foil wound after the electrodeposition step, a side of the raw copper foil near the titanium cathode drum is called "drum side", and the other side of the raw copper foil near the copper electrolyte solution is called "deposited side", the drum side and the deposited side are the outermost sides of the electrolytic copper foil. In another embodiment, for the manufacturing process in which a surface treatment is performed on a single side of the raw copper foil after the electrodeposition step, the electrolytic copper foil comprises a raw copper foil and a surface-treated layer on the raw copper foil. Taking the surface treatment performed on a single side of the raw copper foil near the titanium cathode drum as an example for illustration, a side of the surface-treated layer opposite a side of the raw copper foil is called "drum side", and the other side of the raw copper foil near the copper electrolyte solution is called "deposited side", the drum side and the deposited side are the outermost sides of the electrolytic copper foil. In another embodiment, for the manufacturing process in which a surface treatment is performed on double sides of the raw copper foil after the electrodeposition step, the electrolytic copper foil comprises a raw copper foil and two surface-treated layers on the raw copper foil. In this case, "drum side" is the outermost side of one of the surface-treated layers, and it is opposite to a side of the raw copper foil near the cathode drum during electrodeposition step. "Deposited side" is the outermost side of another surface-treated layer, and it is opposite to the other side of the raw copper foil near the copper electrolyte solution during electrodeposition step. Herein, the drum side and the deposited side are the outermost sides of the electrolytic copper foil.

Comparative Examples 1 to 9: Electrolytic Copper Foil

The electrolytic copper foils of Comparative Examples 1 to 9 were provided for comparison with the electrolytic copper foils of Examples 1 to 10. The process used to produce the electrolytic copper foils of Comparative Examples 1 to 9 was similar to that of Examples 1 to 10. The differences were the cross speed of the buff and the concentration of the glucose and the ETU in the copper electrolyte solution. Parameters of Comparative Examples 1 to 9 different from those of Examples 1 to 10 were also listed in Table 1.

Besides the differences as described above, the titanium cathode drums used in Comparative Examples 1 to 4 and 6 to 9 were also mechanically polished by flap buff like those in Examples 1 to 10, but the titanium cathode drum used in Comparative Example 5 was mechanically polished by disc buff (manufactured by Kure Grinding Wheel Co., Ltd.). Herein, the disc buff has multiple abrasive sheets arranged in parallel along the longitudinal direction and arranged around the axis. Table 1: The girt # and the cross speed of the buff and the concentration of the glucose and the ETU in the copper electrolyte solution used to produce the electrolytic copper foils of Examples 1 to 10 (E1 to E10) and Comparative Examples 1 to 9 (C1 to C9).

| Example No. | Girt # | Cross speed (cpm) | Conc. of glucose (mg/L) | Conc. of ETU (mg/L) |
|---|---|---|---|---|
| E1 | 2000 | 30 | 2.9 | 1.2 |
| E2 | 2000 | 30 | 4.6 | 1.2 |
| E3 | 2000 | 30 | 3.8 | 1.2 |
| E4 | 2000 | 30 | 3.8 | 2.4 |
| E5 | 2000 | 15 | 3.8 | 1.2 |
| E6 | 2000 | 60 | 3.8 | 1.2 |
| E7 | 800 | 30 | 3.8 | 1.2 |
| E8 | 3000 | 30 | 3.8 | 1.2 |
| E9 | 2000 | 25 | 3.8 | 0.9 |
| E10 | 2000 | 30 | 4.6 | 2.0 |
| C1 | 2000 | 30 | 1.5 | 1.2 |
| C2 | 2000 | 30 | 6.9 | 1.2 |
| C3 | 2000 | 30 | 3.8 | 0.6 |
| C4 | 2000 | 30 | 3.8 | 3.6 |
| C5 | 2000 | 30 | 3.8 | 1.2 |
| C6 | 2000 | 10 | 3.8 | 1.2 |
| C7 | 2000 | 80 | 3.8 | 1.2 |
| C8 | 600 | 30 | 3.8 | 1.2 |
| C9 | 4000 | 30 | 3.8 | 1.2 |

Test Example 1: Surface Characteristics

In this test example, the electrolytic copper foils of Examples 1 to 10 and Comparative Examples 1 to 9 were adopted as test samples, and measured by a laser microscope to observe the surface textures of the deposited sides and the drum sides and take their images. The surface characteristics (Sku, Sdr, and Str) of the electrolytic copper foils were evaluated according to ISO 25178-2 (2012), and the results were shown in Table 2 below.

The instrument and the analytical method of the surface characteristics were described as follows:

(1) Instrument:
Laser microscope: LEXT OLS5000-SAF (manufactured by Olympus); and
Objective lenses: MPLAPON-100×LEXT.
(2) Analytical method:
Light wavelength: 405 nm;
Magnification of the objective lenses: 100×;
Optical zoom: 1.0×;
Observation area: 129 μm×129 μm;
Resolution: 1024 pixels×1024 pixels;
Conditions: auto tilt removal;
Filter: unfiltered;
Temperature: 24±3° C.; and
Relative humidity: 63±3%.

Test Example 2: Young's Modulus

In this test example, the electrolytic copper foils of Examples 1 to 10 and Comparative Examples 1 to 9 were cut into a same size to obtain the test samples. According to the method of IPC-TM-650, a material-testing machine was used for a tensile test to obtain the stress-strain curve with the strain (ε) as X-axis and the stress (σ) as Y-axis. A parallel line to the Y-axis was drawn at a strain of 0.5% (i.e., ε=0.005), and the intersection of the curve with the line was the yield strength ($σ_y$).

Subsequently, the Young's modulus of the electrolytic copper foils was calculated by the formula [Young's modulus (E)=yield strength ($σ_y$)/strain (ε)], and the results were shown in Table 2 below.

The instrument and the analytical method were described as follows:

(1) Instrument:

Material-testing machine: AG-I, purchased from Shimadzu Corporation.

(2) Analytical method:

Sample size: 100 mm (length)×12.7 mm (width);

Temperature: ambient temperature (about 25° C.);

Chuck distance: 50 mm; and

Crosshead speed: 50 mm/min.

Table 2: Sku, Sdr, and Str of the drum sides and the deposited sides and Young's modulus of the electrolytic copper foils of Examples 1 to 10 (E1 to E10) and Comparative Examples 1 to 9 (C1 to C9), and the adhesion strengths between the electrolytic copper foils' drum sides and the negative electrode active materials as well as the deposited sides and the negative electrode active materials and charge-discharge cycle life of lithium-ion batteries of Examples 1B to 10B and Comparative Examples 1B to 9B.

In contrast, either the drum side or the deposited side of each of the electrolytic copper foils of Comparative Examples 1 to 9 failed to have all of the three surface characteristics. Specifically, the deposited sides of the electrolytic copper foils of Comparative Examples 1 and 2 had Sku out of the range of 1.8 to 6.4. The drum sides of the electrolytic copper foils of Comparative Examples 8 and 9 had Sdr out of the range of 0.06% to 13%. Also, the deposited sides of the electrolytic copper foils of Comparative Examples 5 and 6 had Str out of the range of 0.1 to 1.

In addition, the deposited sides of the electrolytic copper foils of Comparative Examples 3 and 4 had Sku out of the range of 1.8 to 6.4 and Sdr out of the range of 0.06% to 13%. The drum side of the electrolytic copper foil of Comparative Example 7 also had Sku and Sdr both out of the aforesaid ranges. The drum sides of the electrolytic copper foils of Comparative Examples 5 and 6 had Sku and Str respectively out of the range of 1.8 to 6.4 and the range of 0.1 to 1.

Electrode

Examples 1A to 10A and Comparative Examples 1A to 9A: Negative Electrode

The two outermost opposite sides, i.e., the drum side and the deposited side, of each of the electrolytic copper foils of Examples 1 to 10 and Comparative Examples 1 to 9 may be further coated with a negative electrode slurry containing the negative electrode active substance to produce a negative electrode for a lithium-ion battery.

| Surface characteristics | Electrolytic copper foils | | | | | | | Lithium-ion batteries | | |
|---|---|---|---|---|---|---|---|---|---|---|
| | Sku | | Sdr (%) | | Str | | E (GPa) | Adhesion strength | | Cycle life |
| Criteria | 1.8 to 6.4 | | 0.06 to 13 | | 0.1 to 1 | | 29.4 to 88.2 Total | Not peeled off | | (number) >800 Total |
| Example No. | Drum side | Deposited side | Drum side | Deposited side | Drum side | Deposited side | | Drum side | Deposited side | |
| E1 | 3.1 | 1.8 | 3.74 | 7.51 | 0.59 | 0.71 | 29.4 | ○ | ○ | 1377 |
| E2 | 3.2 | 2.9 | 3.75 | 0.55 | 0.58 | 0.70 | 59 | ○ | ○ | 941 |
| E3 | 3.1 | 3.0 | 3.75 | 1.55 | 0.58 | 0.70 | 47.7 | ○ | ○ | 1085 |
| E4 | 3.1 | 6.4 | 3.74 | 1.01 | 0.59 | 0.71 | 88.2 | ○ | ○ | 809 |
| E5 | 1.8 | 3.1 | 3.74 | 1.54 | 0.10 | 0.10 | 47.7 | ○ | ○ | 1043 |
| E6 | 6.4 | 2.9 | 3.74 | 1.56 | 0.94 | 0.95 | 47.8 | ○ | ○ | 1052 |
| E7 | 3.2 | 2.9 | 12.87 | 1.56 | 0.58 | 0.70 | 47.8 | ○ | ○ | 1174 |
| E8 | 3.1 | 3.0 | 0.06 | 2.01 | 0.59 | 0.70 | 47.7 | ○ | ○ | 844 |
| E9 | 3.1 | 2.0 | 3.73 | 11.9 | 0.18 | 0.19 | 33.1 | ○ | ○ | 1211 |
| E10 | 3.2 | 5.9 | 3.74 | 0.09 | 0.58 | 0.71 | 64.5 | ○ | ○ | 947 |
| C1 | 3.1 | 0.9 | 3.74 | 12.91 | 0.59 | 0.70 | 21.1 | ○ | × | 513 |
| C2 | 3.2 | 9.8 | 3.75 | 0.09 | 0.58 | 0.71 | 98.3 | ○ | × | 598 |
| C3 | 3.2 | 0.2 | 3.74 | 14.51 | 0.59 | 0.70 | 24.4 | ○ | × | 643 |
| C4 | 3.1 | 7.9 | 3.74 | 0.02 | 0.58 | 0.70 | 103.2 | ○ | × | 652 |
| C5 | 0.9 | 3.0 | 3.75 | 1.55 | 0.06 | 0.08 | 47.8 | × | × | 592 |
| C6 | 0.4 | 3.0 | 3.74 | 1.56 | 0.06 | 0.07 | 47.7 | × | × | 607 |
| C7 | 8.4 | 3.1 | 15.01 | 2.11 | 0.94 | 0.94 | 47.7 | × | ○ | 571 |
| C8 | 3.1 | 2.9 | 14.79 | 2.35 | 0.59 | 0.70 | 47.8 | × | ○ | 637 |
| C9 | 3.2 | 3.0 | 0.02 | 1.55 | 0.58 | 0.70 | 47.8 | × | ○ | 540 |

Discussion of Surface Characteristics of the Electrolytic Copper Foils

As shown in Table 2 above, the electrolytic copper foils of Examples 1 to 10 had all of the following three surface characteristics:

(1) The drum side and the deposited side each have a Sku in a range of 1.8 to 6.4;

(2) The drum side and the deposited side each have a Sdr in a range of 0.06% to 13%; and (3) The drum side and the deposited side each have a Str in a range of 0.1 to 1.

Specifically, the negative electrode can be produced by the following steps.

Firstly, at a solid-liquid ratio of 100:60, 100 g of negative electrode active material was mixed with 60 g of a solvent (N-methylpyrrolidone (NMP)) to prepare the negative electrode slurry. The composition of the negative electrode active material (the content of each component was based on the entire negative electrode active material as 100 wt %) in the negative electrode slurry was described as follows:

93.9 wt % of negative electrode active substance (mesophase graphite powders, MGP);

1 wt % of conductive additive (conductive carbon black powders, Super P®);

5 wt % of a solvent binder (polyvinylidene fluoride, PVDF 6020); and 0.1 wt % of oxalic acid.

Next, the negative electrode slurry was coated on each of the drum side and the deposited side of the electrolytic copper foil and then dried in an oven. After that, the negative electrode slurry coated on the electrolytic copper foil was pressed by a pressing machine to a density of 1.5 grams per cubic centimeter ($g/cm^3$), and a negative electrode was obtained.

The parameters for producing the negative electrode were described as follows:

Coating rate: 5 m/min;
Coating thickness: about 200 μm;
Drying temperature: about 160° C.;
Pressing speed: 1 m/min;
Pressing pressure: 3000 pounds per square inch (psi);
Size of the rollers in the pressing machine: 250 mm (outside diameter, φ)×250 mm (width);
Hardness of the rollers: 62 to 65 HRC; and
Material of the rollers: high-carbon chromium bearing steel (SUJ2).

The electrolytic copper foils of Examples 1 to 10 and Comparative Examples 1 to 9 could be respectively processed with the aforesaid method to obtain the negative electrodes of Examples 1A to 10A and Comparative Examples 1A to 9A.

Test Example 3: Adhesion Strength

In this test example, the negative electrodes of Examples 1A to 10A were cut into a size of 100 mm×50 mm (along the machine direction (MD)×along the transverse direction (TD)) to obtain the test samples. Similarly, the negative electrodes of Comparative Examples 1A to 9A could be processed with the aforesaid method to obtain the test samples, which were adopted to evaluate the adhesion strengths between the electrolytic copper foils and the negative electrode active materials.

Next, tapes of a same type respectively were adhered on both outer surfaces of the negative electrode active materials of each test sample, and then a universal testing machine was used to measure adhesion strengths between the drum side of the electrolytic copper foil and the negative electrode active material and between the deposited side of the electrolytic copper foil and the negative electrode active material of each test sample.

If the negative electrode active material was detached from the surface of the electrolytic copper foil while the tape was peeled off from the negative electrode active material, it means that the adhesion strength between the surface of the electrolytic copper foil and the negative electrode active material was insufficient and the result was marked as "x" in Table 2 above. If the negative electrode active material was not detached from the surface of the electrolytic copper foil while the tape was peeled off from the negative electrode active material, it means that the adhesion strength between the surface of the electrolytic copper foil and the negative electrode active material was good, so the electrolytic copper foil could pass the adhesion strength test, and the result was marked as "o" in Table 2 above.

The analytical method of the adhesion strength was described as follows:

Universal testing machine: TKS-20N, manufactured by IMADA;

Test temperature: about 15° C. to 35° C.;
Tape: 810 D, purchased from 3M;
Peeling angle: the tape peeled from the surface of the negative electrode active material at 90°, and
Peeling speed: 50 mm/min.

Lithium-Ion Battery

Examples 1B to 10B and Comparative Examples 1B to 9B: Lithium-Ion Battery

The aforesaid negative electrodes of Examples 1A to 10A and Comparative Examples 1A to 9A could be further respectively adopted with positive electrodes to prepare the lithium-ion batteries of Examples 1B to 10B and Comparative Examples 1B to 9B.

Specifically, the positive electrode for the lithium-ion battery was obtained in accordance with the method as follows.

Firstly, at a solid-liquid ratio of 100:195, 100 g of the positive electrode active material was mixed with 195 g of NMP to prepare a positive electrode slurry. The composition of the positive electrode active material (the content of each component was based on the entire positive electrode active material as 100 wt %) in the positive electrode slurry was described as follows:

89 wt % of positive electrode active substance ($LiCoO_2$);
5 wt % of conductive additive (flaked graphite, KS6);
1 wt % of conductive additive (conductive carbon black powders, Super P®); and
5 wt % of polyvinylidene fluoride (PVDF 1300).

Next, the positive electrode slurry was coated on an aluminum foil, and after the solvent was evaporated, the positive electrodes and the negative electrodes were cut into a specific size, and then the positive electrodes and the negative electrodes were alternately stacked with a microporous separator (model: Celgard 2400, manufactured by Celgard Co., Ltd.) sandwiched there between, and then placed in a pressing mold filled with the electrolyte solution (model: LBC322-01H, purchased from Shenzhen Capchem Technology Co., Ltd.), and sealed to form a laminated lithium-ion battery. The laminated lithium-ion battery was in a size of 41 mm×34 mm×53 mm.

Test Example 4: Charge-Discharge Cycle Life Performance

For the evaluation of the charge-discharge cycle life performance of the lithium-ion battery, each of the lithium-ion batteries of Examples 1B to 10B and Comparative Examples 1B to 9B was adopted as the test sample.

The analytical method of the charge-discharge cycle life performance was described as follows:

Charging mode: constant current-constant voltage (CCCV);
Discharging mode: constant current (CC);
Charging voltage: 4.2 volts (V);
Charging current: 5 C;
Discharging voltage: 2.8 V;
Discharging current: 5 C; and
Test temperature: about 55° C.

The charge-discharge cycle life of the lithium-ion battery was defined as the number of charge and discharge cycles a lithium-ion battery performed when the capacity dropped to 80% of its initial capacity. The results of the charge-discharge cycle life performance test of the lithium-ion batteries of Examples 1B to 10B, which respectively comprise the electrolytic copper foils of Examples 1 to 10, and Comparative Examples 1B to 9B, which respectively comprise the electrolytic copper foils of Comparative Examples 1 to 9, were also shown in Table 2 above.

According to the aforesaid manufacturing process, the differences between the lithium-ion batteries of Examples 1B to 10B and the lithium-ion batteries of Comparative Examples 1B to 9B were the electrolytic copper foils used in the negative electrodes, so the charge-discharge cycle life performance of the lithium-ion battery was mainly attributed to the characteristics of each electrolytic copper foil.

Discussion of Experimental Results

According to the experimental results as shown in Table 2 above, the drum sides and the deposited sides of the electrolytic copper foils of Examples 1 to 10 all had the aforesaid three surface characteristics, i.e., Sku, Sdr, and Str were all controlled in the suitable range, and thus the drum sides and the deposited sides of these electrolytic copper foils could obtain sufficient adhesion strengths with the negative electrode active materials when they were applied to the negative electrodes of Examples 1A to 10A, which means that these electrolytic copper foils could pass the adhesion strength test from their drum sides and their deposited sides, such that the charge-discharge cycle life of the lithium-ion batteries of Examples 1B to 10B could be improved to more than 800 times.

In contrast, since the drum sides and the deposited sides of the electrolytic copper foils of Comparative Examples 1 to 9 failed to have all of the three surface characteristics, at least one of the drum side and the deposited side of each of these electrolytic copper foils had problem of insufficient adhesion strength with the negative electrode active material, and therefore the charge-discharge cycle life of the lithium-ion batteries of Comparative Examples 1B to 9B failed to reach 800 times, or even failed to reach 700 times. That is, the charge-discharge cycle life performance of the lithium-ion batteries of Comparative Examples 1B to 9B was obviously poorer than the charge-discharge cycle life performance of the lithium-ion batteries of Examples 1B to 10B.

From the experimental results of Table 2, the deposited sides of the electrolytic copper foils of Comparative Examples 1 and 2 had Sku respectively lower than the lower limit of 1.8 and higher than the upper limit of 6.4, so the electrolytic copper foils of Comparative Examples 1 and 2 could not pass the adhesion strength test from their deposited sides, and therefore the charge-discharge cycle life of the lithium-ion batteries of Comparative Examples 1B and 2B could not reach more than 700 times. Furthermore, the drum sides of the electrolytic copper foils of Comparative Examples 8 and 9 had Sdr respectively lower than the lower limit of 0.06% and higher than the upper limit of 13%, so the electrolytic copper foils of Comparative Examples 8 and 9 also could not pass the adhesion strength test from their drum sides, and therefore the charge-discharge cycle life of the lithium-ion batteries of Comparative Examples 8B and 9B could not reach 700 times. Furthermore, the deposited sides of the electrolytic copper foils of Comparative Examples 5 and 6 had Str lower than the lower limit of 0.1, so these two electrolytic copper foils also could not pass the adhesion strength test from their deposited sides, and therefore the lithium-ion batteries of Examples 5B and 6B had poor charge-discharge cycle life performance.

According to the results above, if Sku, Sdr, and Str of one of the outermost sides (the drum side or the deposited side) of the electrolytic copper foil were not all controlled in their respective suitable ranges, the outermost side lacked sufficient adhesion strength with the negative electrode active material, such that the negative electrode active material was easily peeled off or detached from the surface of the electrolytic copper foil during charging and discharging, and thus the charge-discharge cycle life of the lithium-ion battery was severely shortened. In other words, the three surface characteristics of Sku, Sdr, and Str of the electrolytic copper foil are all indispensable. For example, if Sku and Sdr of the deposited side of the electrolytic copper foil were controlled but Str was not controlled, resulting in that the deposited side of the electrolytic copper foil (e.g., Comparative Examples 5 and 6) lacked adhesion strength with the negative electrode active material, the charge-discharge cycle life performance of the lithium-ion battery was deteriorated. Similarly, if Sdr and Str of the deposited side of the electrolytic copper foil were controlled but Sku was not controlled, resulting in that the deposited side of the electrolytic copper foil (e.g., Comparative Examples 1 and 2) lacked adhesion strength with the negative electrode active material, the electrolytic copper foil applied to the lithium-ion battery exhibited inferior charge-discharge cycle life performance.

In addition, the surface characteristics of the electrolytic copper foils of Comparative Examples 3 and 4 in Table 2 above showed that Sku and Sdr of the deposited sides of Comparative Examples 3 and 4 were respectively out of the range of 1.8 to 6.4 and the range of 0.06% to 13%, resulting in that the deposited sides of the electrolytic copper foils lacked adhesion strengths with the negative electrode active materials, and thus the lithium-ion batteries of Comparative Examples 3B and 4B could not obtain the desired charge-discharge cycle life performance. Similarly, from the results of the adhesion strength of the electrolytic copper foil of Comparative Example 7 and the charge-discharge cycle life performance of the lithium-ion battery of Comparative Example 7B in Table 2 above, when Sku and Sdr of the drum side of the electrolytic copper foil were not well controlled, the lithium-ion battery of Comparative Example 7B also could not obtain the desired adhesion strength and the desired charge-discharge cycle life performance. Similarly, from the results of the adhesion strengths of the electrolytic copper foils of Comparative Examples 5 and 6 and the charge-discharge cycle life performance of the lithium-ion batteries of Comparative Example 5B and 6B in Table 2 above, when Sku and Str of the drum side of the electrolytic copper foil were not well controlled, the lithium-ion batteries of Comparative Example 5B and 6B also could not obtain the desired adhesion strength and the charge-discharge cycle life performance.

Furthermore, comparing the results of the three surface characteristics of the electrolytic copper foils of Examples 1 to 10, when Sdr of both the deposited side and the drum side was controlled in the range of 1.5% to 13% (e.g., Examples 1, 3, 5 to 7, and 9), the adhesion strengths between the electrolytic copper foils and the negative electrode active materials could be further improved, thereby prolonging the charge-discharge cycle life of the lithium-ion batteries of Examples 1B, 3B, 5B to 7B, and 9B up to more than 1000 times.

In addition to the aforesaid surface characteristics of the electrolytic copper foils, the Young's modulus of the electrolytic copper foils of Comparative Examples 1 to 4 were also out of the range of 29.4 GPa to 88.2 GPa. The electrolytic copper foils of Comparative Examples 1 and 3 had lower Young's modulus, the electrolytic copper foils failed to have good surface characteristics and were prone to wrinkles, and thereby the charge-discharge cycle life of the lithium-ion batteries was shortened. The electrolytic copper foils of Comparative Examples 2 and 4 had extremely high Young's modulus, so the electrolytic copper foils were more brittle and were easily cracked or broken, which also shortened the charge-discharge cycle life of the lithium-ion batteries of Comparative Examples 2B and 4B. In contrast, the Young's modulus of the electrolytic copper foils of Examples 1 to 10 fell into a suitable range, such that these electrolytic copper foils were not easily wrinkle, cracked or broken during the manufacturing process. The results demonstrated again that the lithium-ion batteries of Examples 1B to 10B could have better charge-discharge cycle life performance than those of Comparative Examples 1B to 9B.

In summary, by controlling the three surface characteristics (Sku, Sdr, and Str) of the drum side and the deposited side of the electrolytic copper foil, the adhesion strengths between the drum side and the negative electrode active material as well as between the deposited side and the negative electrode active material can be both improved, thereby prolonging the charge-discharge cycle life and improving overall performance of the lithium-ion battery comprising such electrolytic copper foil.

Even though numerous characteristics and advantages of the instant disclosure have been set forth in the foregoing description, together with details of the structure and features of the disclosure, the disclosure is illustrative only. Changes may be made in the details, especially in matters of material, shape, size, and arrangement of parts within the principles of the disclosure to the full extent indicated by the broad general meaning of the terms in which the appended claims are expressed.

What is claimed is:

1. An electrolytic copper foil, comprising:
a drum side and a deposited side opposite the drum side;
wherein the drum side and the deposited side each have a Kurtosis (Sku) in a range of 1.8 to 6.4, the drum side and the deposited side each have a developed interfacial area ratio (Sdr) in a range of 0.06% to 13%, and the drum side and the deposited side each have a texture aspect ratio (Str) in a range of 0.1 to 1.

2. The electrolytic copper foil as claimed in claim 1, wherein the Young's modulus of the electrolytic copper foil is in a range of 29.4 gigapascals to 88.2 gigapascals.

3. The electrolytic copper foil as claimed in claim 1, wherein the developed interfacial area ratio (Sdr) of the drum side and the developed interfacial area ratio (Sdr) of the deposited side are each in a range of 1.5% to 13%.

4. The electrolytic copper foil as claimed in claim 1, wherein the texture aspect ratio (Str) of the drum side and the texture aspect ratio (Str) of the deposited side are each in a range of 0.1 to 0.95.

5. The electrolytic copper foil as claimed in claim 1, wherein the electrolytic copper foil comprises a raw copper foil and a surface-treated layer on the raw copper foil, and the drum side and the deposited side are outermost sides of the electrolytic copper foil.

6. The electrolytic copper foil as claimed in claim 2, wherein the electrolytic copper foil comprises a raw copper foil and a surface-treated layer on the raw copper foil, and the drum side and the deposited side are outermost sides of the electrolytic copper foil.

7. The electrolytic copper foil as claimed in claim 3, wherein the electrolytic copper foil comprises a raw copper foil and a surface-treated layer on the raw copper foil, and the drum side and the deposited side are outermost sides of the electrolytic copper foil.

8. The electrolytic copper foil as claimed in claim 4, wherein the electrolytic copper foil comprises a raw copper foil and a surface-treated layer on the raw copper foil, and the drum side and the deposited side are outermost sides of the electrolytic copper foil.

9. The electrolytic copper foil as claimed in claim 1, wherein the electrolytic copper foil comprises substantially no roughening-treated layer.

10. The electrolytic copper foil as claimed in claim 2, wherein the electrolytic copper foil comprises substantially no roughening-treated layer.

11. The electrolytic copper foil as claimed in claim 3, wherein the electrolytic copper foil comprises substantially no roughening-treated layer.

12. The electrolytic copper foil as claimed in claim 4, wherein the electrolytic copper foil comprises substantially no roughening-treated layer.

13. An electrode of a lithium-ion battery, comprising the electrolytic copper foil as claimed in claim 1.

14. The electrode of the lithium-ion battery as claimed in claim 13, wherein the Young's modulus of the electrode is in a range of 29.4 gigapascals to 88.2 gigapascals.

15. The electrode of the lithium-ion battery as claimed in claim 13, wherein the developed interfacial area ratio (Sdr) of the drum side and the developed interfacial area ratio (Sdr) of the deposited side are each in a range of 1.5% to 13%.

16. The electrode of the lithium-ion battery as claimed in claim 13, wherein the texture aspect ratio (Str) of the drum side and the texture aspect ratio (Str) of the deposited side are each in a range of 0.1 to 0.95.

17. The electrode of the lithium-ion battery as claimed in claim 13, wherein the electrode comprises a raw copper foil and a surface-treated layer on the raw copper foil, and the drum side and the deposited side are outermost sides of the electrolytic copper foil.

18. The electrode of the lithium-ion battery as claimed in claim 14, wherein the electrolytic copper foil comprises a raw copper foil and a surface-treated layer on the raw copper foil, and the drum side and the deposited side are outermost sides of the electrolytic copper foil.

19. A lithium-ion battery, comprising the electrode as claimed in claim 13.

* * * * *